United States Patent [19]

Ray

[11] Patent Number: 5,549,939
[45] Date of Patent: Aug. 27, 1996

[54] ORNAMENTAL DEVICE FOR METAL STRUCTURE

[76] Inventor: Freddie W. Ray, 2034 Daisy Meadow La., North Las Vegas, Nev. 89030

[21] Appl. No.: 201,978

[22] Filed: Feb. 25, 1994

[51] Int. Cl.⁶ .................................................. B60R 13/00
[52] U.S. Cl. .................. 428/31; 2/425; 40/591; 40/592; 428/900
[58] Field of Search ................ 2/422, 425; 428/31, 428/900; 40/591, 592

[56] References Cited

U.S. PATENT DOCUMENTS

| | | | |
|---|---|---|---|
| 2,659,169 | 11/1953 | Brennan | 428/3 X |
| 2,960,786 | 11/1960 | Wagner | 428/31 X |
| 3,070,919 | 1/1963 | Peckham | 428/31 X |
| 3,230,653 | 1/1966 | Rice | 40/591 |
| 3,263,235 | 8/1966 | Young | 2/422 |
| 3,670,438 | 6/1972 | Carroll et al. | 40/591 X |
| 4,446,576 | 5/1984 | Hisataka | 2/425 |
| 4,519,153 | 5/1985 | Moon et al. | 40/591 |
| 4,574,726 | 3/1986 | Sullivan | 40/592 X |
| 4,582,017 | 4/1986 | Ostermiller | 40/591 X |
| 4,972,795 | 11/1990 | Mace | 116/28 R |

*Primary Examiner*—Henry F. Epstein
*Attorney, Agent, or Firm*—Quirk & Tratos

[57] ABSTRACT

An ornamental device is mounted on a vehicle for displaying a fan's sports team preference. A first embodiment includes a molded cap replica of a sports team official cap. A first means for attaching the cap to the vehicle comprises a magnet. A second means for attaching the molded cap to the vehicle is through use of a cord. The cord and magnet may also both be used. The cord is connected to one end of the outer diameter of the molded cap, and subsequently is stretched across the top of the roof, through the interior of the car, then secured to the opposite side of the molded cap. Sports fans can appreciate the simple device which is, easily seen by others, and yet quickly and easily removable. In a second embodiment, a fabric cap is placed over a molded cap and secured to the molded cap.

16 Claims, 5 Drawing Sheets

ORNAMENTAL DEVICE FOR METAL STRUCTURE

BACKGROUND OF THE INVENTION

1. Field of the Invention

The present invention generally relates to ornamental devices mounted on vehicles, and more specifically to baseball caps used by fans for displaying sports team preferences which can be mounted on the roof of a vehicle.

2. Description of the Related Art

The invention relates to novel improvements in an ornamental device mounted on a vehicle for displaying a fan's preference for a particular sports team.

It is well known that sports fans become particularly excited at events featuring their favorite team. For instance, high-school students and fans enjoy participating at pep rallies at their schools and then traveling to the game in automobiles decorated with slogans, ribbons, and flags. Other fans display school name decals on their car bumpers or in windows. Amateur and professional teams and fans display their team preferences with jerseys, banners, and ball caps. The many and different ways of supporting their respective teams are enjoyable, yet are particularly effective when others see the display of support.

The field of ornamental devices for metal structures is crowded, yet relatively few are designed with the sports fan in mind, particularly when the loyal and supportive fan wants others to know by actively displaying in some manner his or her team preference.

Several prior art documents disclose items for attachment to vehicles. For example, U.S. Pat. No. 4,972,795, to Mace, issued Nov. 27, 1990, discloses an antenna marker device for automobiles. U.S. Pat. No. 4,519,153, to Moon et al., discloses a display device for use with cars, and U.S. Pat. No. 2,960,786 contains a description of nestable car top signs.

Other prior art discloses a variety of ornamental devices, as well as "in distress" signs.

Each of the above-mentioned patented devices provided certain desirable features. However, each device also has disadvantages or has left problems unsolved. For example, U.S. Pat. No. 4,972,795 to Mace discloses a device which is said to enhance the visibility of an individual's automobile by securing a relatively small device to an uppermost end of the automobile antenna. This device is quite small and not as readily visible as the present invention, and therefore could not draw attention to a sports fan's team preference. In addition, the Mace device is of a somewhat complex construction compared to the present invention. Finally, the device of Mace is not easily removable from the vehicle, as is the present invention.

The Moon et al. reference discloses a removable display device that a sports fan can use at a sporting event. However, similar to the Mace device, the flag-type device of Moon is neither as easily visible nor as adaptable to the fickleness of sports fans when they decide to change favorite teams, as is allowed by the present invention.

Lastly, the Wagner patent, U.S. Pat. No. 2,960,786, discloses a complex system for nesting signs on top of an automobile. This system is quite complex as compared to the simple device of the present invention.

The present invention provides improvements to an ornamental device mounted on a vehicle for displaying a fan's sports team preference. A first preferred embodiment includes a ball cap formed by a mold into a plastic replica of a sports team official cap. The molded ball cap is affixed to a metal surface, such as the roof of a car, with a magnet of appropriate pull weight. Pull weight is the amount of force required to move or dislodge the magnet from its position. Using such a magnet allows the device to be easily removed from a vehicle, and provides the advantageous feature that the cap being displayed may easily be changed.

The magnet is preferably attached to the molded cap by means of an attaching bar. The bar is adapted to fit within the inside diameter of the cap, extending the length of the inside diameter from one side of the cap to the other. One way of securing the bar to the molded cap is by using a snap fit mechanism in which the attaching bar is appropriately shaped so that it snaps into a matching part of the molded cap. Another means for securing the bar to the cap is through use of appropriate sized screws, nuts, bolts, and/or washers.

In order to protect the car roof or other metal surface, a suitable material, such as felt, is preferably attached to the bottom or engaging surface of the magnet with glue or other suitable means.

An alternative means for affixing the molded cap to the vehicle is with a suitable length of cord. The cord is adapted to connect at each end to the outer diameter of the molded cap, and is of a length sufficient to be tied to a part of the vehicle. For example, a loop may be tied in each end of the cord, with a first end anchored to the cap. The other end may then be stretched across the roof of the vehicle, through an open door and the interior of the car to an opposite side, and then out the opposite door. Finally, the cord is placed under tension and the other end of the cord is tied off to the opposite side of the molded ball cap in fashion similar to the first end. Of course, it is possible to affix the molded cap to the metal surface with both a magnet and a cord.

In yet another preferred embodiment, a fabric cap is placed over a molded ball cap, like that described above, and is secured to the molded cap. One way to secure the caps to one another is with a rubber band of sufficient thickness and tension to hold a visor of the fabric cap, and therefore the entire fabric cap, to visor of the molded cap. Another way is to loop an attachment cord similar to that described above through both the molded cap and the fabric cap using aligning holes located at the bottom edge of both caps. The cord is then identically fastened to both the fabric cap and molded cap.

This embodiment has the advantage of allowing a fan to very quickly interchange caps. Further, the cap which is used in this embodiment to display fan allegiance to a team may simply be that fan's own cap which he or she normally wears.

A method of assembly of the first embodiment includes inserting and securing a magnet through a metallic attaching bar, securing the attaching bar within the inside diameter of a molded cap, adapting a protective pad to cover the surface of the magnet, and affixing the magnet to the metal surface.

A method of assembly of the second embodiment includes inserting and securing a magnet through a metallic attaching bar, fitting a fabric cap over a molded cap, securing the fabric cap to the molded cap using a rubber band around the visor of the fabric cap, securing the attaching bar within the inside diameter of the molded cap as well as to the outer fabric cap, adapting a protective pad to cover the surface of the magnet, and finally affixing the magnet to the metal surface.

An alternative or additional method of securing the ornamental device to the metal surface is by connecting a first end of a cord to one side of the molded cap or both caps, depending on the embodiment, looping the cord through the interior of a car, and attaching the second end of the cord to the opposite side of the molded cap or caps.

In summary, the advantages of the present invention include: 1) attachability of an ornamental display device to a vehicle, which device is preferably used to display sports team preference, the device being large enough to be readily observable when the vehicle is viewed; 2) a device which is easily removable and interchangeable; and 3) a device which is inexpensive, and of simple design.

These and other features and advantages of the present invention are set forth more completely in the accompanying drawings and the following description.

BRIEF DESCRIPTION OF THE DRAWINGS

Details of the invention, and of the preferred embodiments thereof, will be further understood upon reference to the drawings, wherein.

DETAILED DESCRIPTION OF THE PREFERRED EMBODIMENTS

Figure 1:
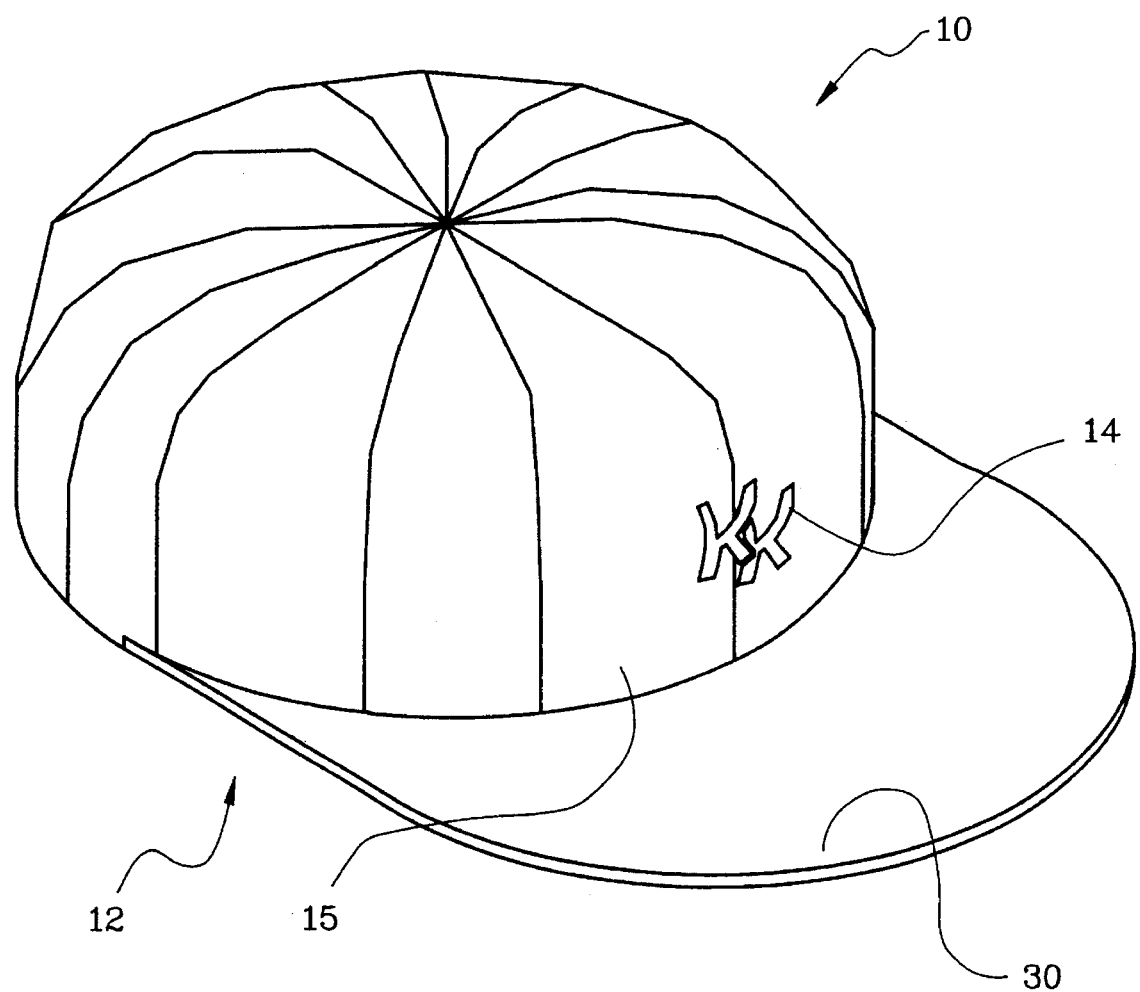
FIG. 1 is a perspective view of a first embodiment of the present invention illustrating a molded cap.

Referring to FIG. 1, an ornamental device 10 comprising a molded cap 12 as illustrated.

In general, the molded cap 12 is representative of a ball cap used in many different situations. Typically, and most frequently, ball caps are used by sports teams, including baseball, softball, volleyball or other outdoor or indoor activities. These ball caps identify the team members.

Virtually identical ball caps are used by fans of the sports teams. The fans identify internally with the teams and therefore want to externally display their team preference to others. Enthusiasm is frequently generated by fans using these caps. Preferably the molded cap 12 is manufactured of plastic and is a replica of a sports team official cap (and is therefore of approximately the same size, although the cap 12 may be made larger or smaller, depending on the viewing effect desired). The ornamental device 10 is intended to be mounted in a variety of ways to a metal surface 11 (see FIG. 5) of a vehicle. By mounting the device 10 to a vehicle, fans can easily be identified by others as supporters of a particular team. The device 10 is preferably designed to be of sufficient size to be seen from a relatively great distance, by its color, style, and/or sports team logo.

Also shown in FIG. 1 is a first logo 14 located on a front surface 15 of the cap 12. The logo 14 is representative of a sports team or sponsor initials. A word can also be used in place of initials, such as the team or sponsor name.

Figure 2:
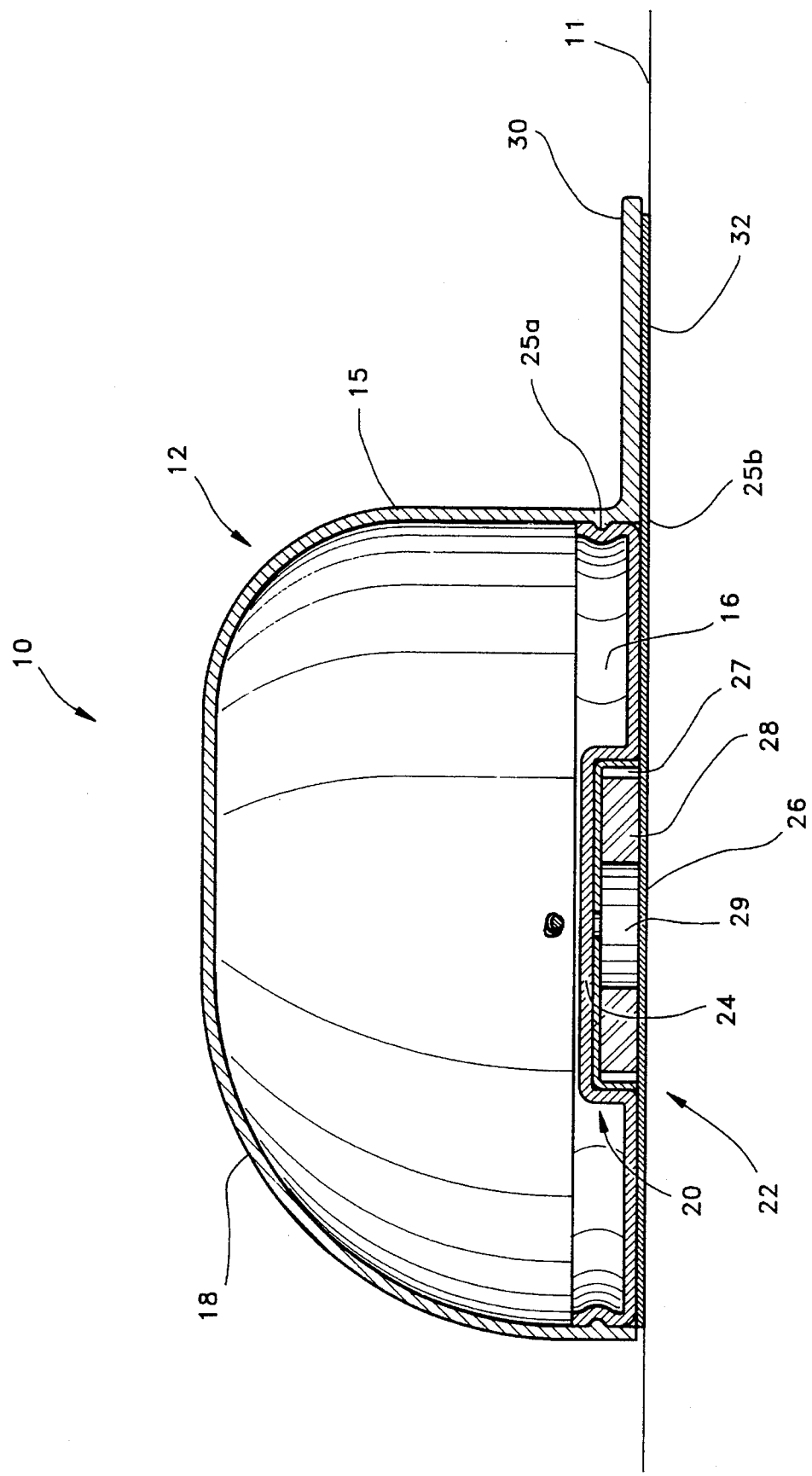
FIG. 2 is a right side in partial section of the cap illustrating in particular a magnet for removably mounting the cap on a vehicle's metal surface, with a metal surface in phantom.

Referring next to FIG. 2, there is seen the ornamental device 10, in partial section, illustrating the first preferred embodiment molded cap 12. In general, the cap 12 comprises a hollow crown 18, a visor 30, and a base member 16 located with the otherwise open base of the crown 18. A cylindrical shaped indentation 20 is preferably integrally formed within the molded base member 16.

An appropriate first fastener mechanism 22 is located within the indentation 20. In one configuration, the first fastener mechanism 22 is attached to the molded cap 12 by a preferably thin metallic attaching bar 24. The attaching bar 24 is adapted to fit within the inside diameter of the molded cap 12, extending the length of the inside diameter from one side of the cap 12 to the other. Preferably, the bar 24 includes a recessed section 27 which extends into the indentation 20 located within the molded base member 16.

The attaching bar 24 may be secured to the molded cap 12 by using a snap fit mechanism. For instance, as shown in FIG. 2, the attaching bar 24 is formed with several indentations, 25B into which a male end feature 25A located on the cap 12 snaps. Another way of securing the attaching bar 24 to the molded cap 12 is by using appropriately sized screws, nuts, bolts, and/or washers (not shown) secured to the opposite ends of the outer diameter of the molded cap 12. Further, it is noted that while the bar 24 is preferably made of metal, it can be made of other similarly strong and resilient materials, such as plastic.

The first attaching mechanism 22 preferably comprises a magnet 28 connected to the bar 24, and located within the recessed area 27 thereof. The magnet 28 preferably includes a center attaching section 29 which is preferably connected to an attaching member 26 connected to the bar 24.

The magnet 28 is preferably a silicone type with a pull weight of about 90 pounds. This magnet 28 is also preferably light-weight, and in its preferred embodiment weighs less than about 10 ounces, and most preferably is only about 8 ounces in weight or less. A magnet 28 having these desired features can be obtained from The Magnet Store™ of Colorado, under their catalog number RB-80.

Pull weight is a term which describes the amount of force required to move or dislodge the magnet 28 from its location. The preferred pull weight allows the magnet 28 to be strong enough to hold the ornamental device 10 in tangential contact to the metal surface 11, yet simultaneously allows a user to easily remove the device 10 from surface 11 when desired. If the metal surface 11 is located on a vehicle, such as a car, the preferred magnet 28 holds the device 10 securely to the vehicle in any normal driving condition.

The preferred pull weight also allows for easy removal of the device. A sports fan may wish to interchange the device 10 for a device having a different logo. Further, the fan may simply wish to remove the device 10 from the vehicle at certain times for a variety of reasons. Therefore, the ornamental device 10 desirably needs to be easily removable. This is accomplished by having the magnet 28 have a pull weight which is not excessive in relation to that needed to keep the device 10 on the vehicle.

Across the bottom 16 of the crown 18 and extending underneath the cap visor 30 is a protective pad 32. The protective pad is preferably a material which protects the surface of the vehicle 11 from scratching and chipping incurred upon attaching, removing, or possible sliding of the ornamental device 10. One such material is felt. One way of adapting the protective pad to the ornamental device 10 is by using an appropriate glue. Further, it is noted that the pad 32 may be merely connected to the bottom of the magnet 28, although it is preferable to locate the pad 32 across the bottom of the entire cap 12, as even the plastic material of the cap has the potential to scratch or mar the surface of the vehicle.

Figure 3:
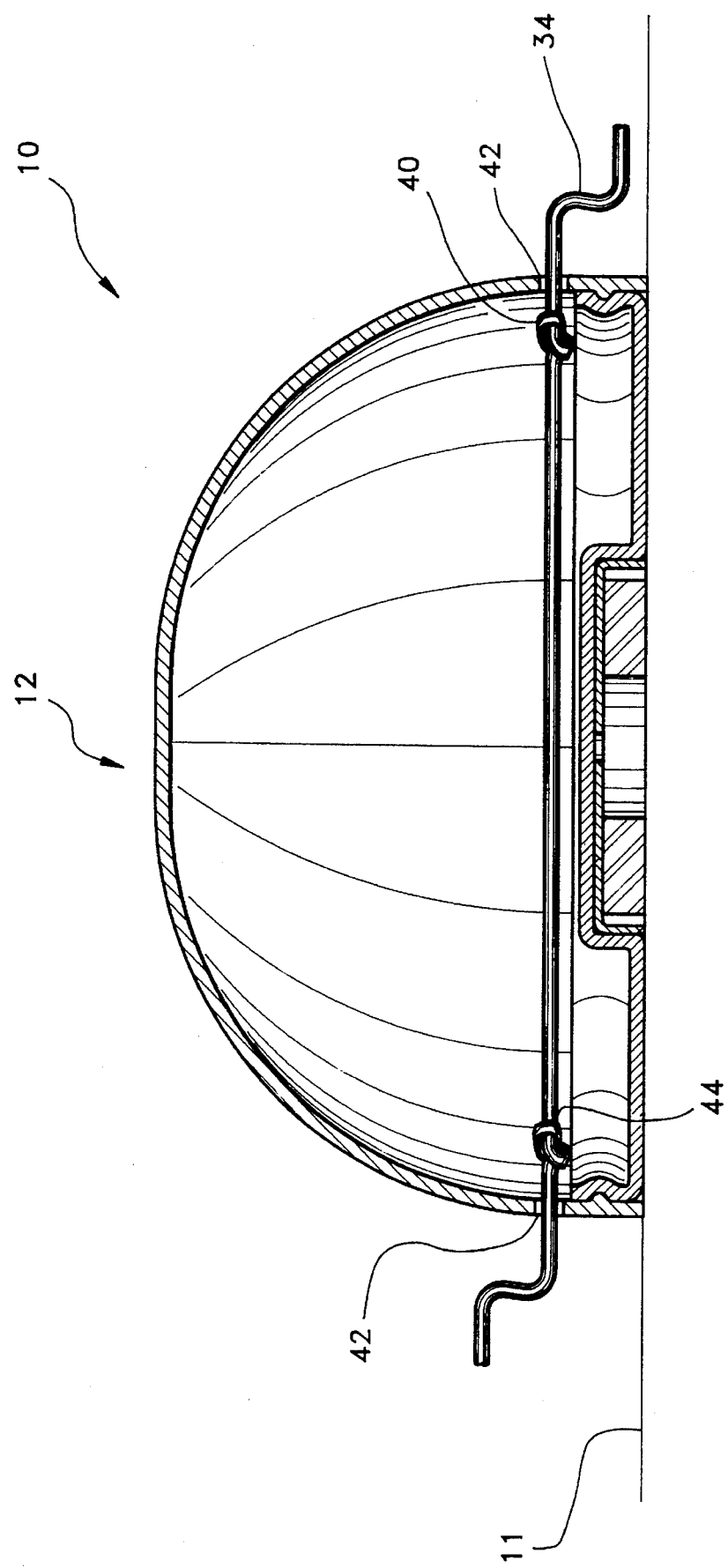
FIG. 3 is a rear view in partial section of FIG. 1, illustrating both a cord and a magnet for removably mounting the cap on a vehicle's metal surface, with a metal surface in phantom.

Referring now to FIG. 3, there is illustrated another attaching means for device 10. This attachment means is generally illustrated as cord 34. This attachment means may be used either separately or in conjunction with the magnet 28 to mount the ornamental device 10 to the metal surface 11. Preferably, the cord 34 is added for additional safety to ensure the device 10 adheres to the vehicle in the event the magnet 28 does not secure the device 10 to the vehicle.

The cord 34 is connected at each side of the outer diameter of the molded cap 12, such as by tying knots in each end of the cord 34. Other means for affixing the cord 34, as are well known to those skilled in the art, are also acceptable. In order to use the cord 34 to attach the device 10 to a vehicle, the cord 34 passes through apertures 42 located in the bottom edge of the molded cap 12, and is subsequently stretched across the top of a roof, through an open automobile door and into and across the interior of the vehicle to the opposite side, and then out an opposite door by a user. Finally, the cord 34 is placed under tension and tied off to the opposite side of the molded cap 12 in similar fashion as the starting side.

The cord 34 is preferably nylon of about ⅛ inch (0.3 cm) in diameter. The cord 34, however, may be made of any small diameter, strong and fairly smooth materials. The knots 40 and 44 in the cord 34 are preferably arranged so that they are located within the cap 12, as shown in FIG. 3. The knots 40 and 44 are is then prevented from being pulled through aperture. Alternatively, the knots 40 and 44 may be made external to the molded cap form 12.

As is clearly understood from the foregoing description, the present invention is inexpensive to manufacture because of its simple and flexible design. Further, the device 10 is easily adaptable to use with any vehicle.

Figure 4:
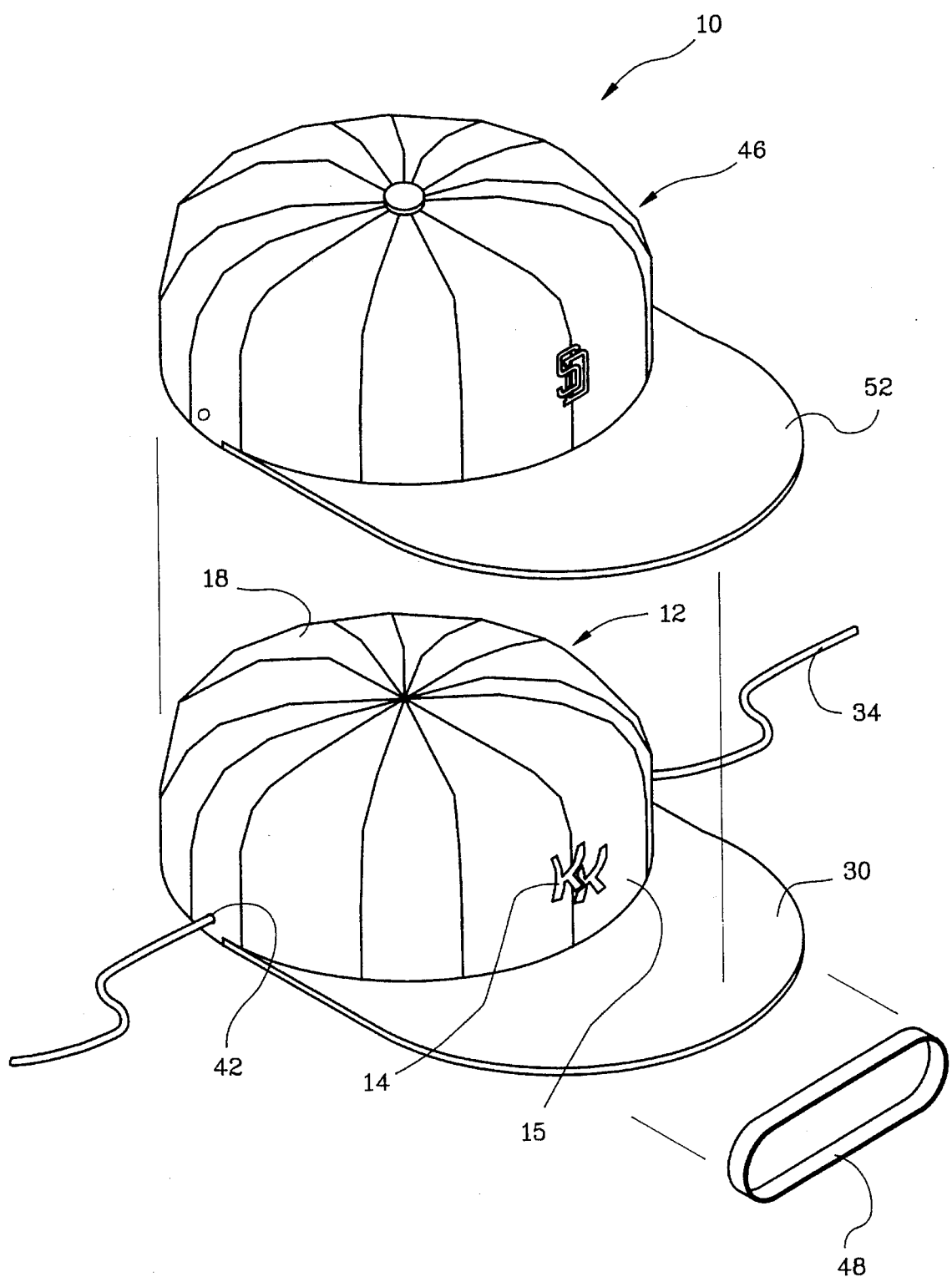
FIG. 4 is an exploded perspective view of a second embodiment of the present invention, illustrating a fabric cap for placement over a molded cap and a rubber band for securing the caps together.

Referring next to FIG. 4, there is seen a second embodiment of the ornamental device 10, illustrating how a fabric cap 46 may be fitted over a molded cap 12 and secured thereto with a rubber band 48.

In this embodiment, the molded cap 12 is again used. However, a similar sized fabric cap 46 is placed over the molded cap 12 and secured to the molded cap 12 in at least one of several ways. A first way is with a rubber band 48 of sufficient thickness and tension to hold a visor 52 of the fabric cap 46, and therefore the entire fabric cap 46, to the molded cap 12. Another way is to connect the cord 34 described in the first embodiment through both the molded cap 12 and the fabric cap 46 using aligning holes at the bottom edge of both caps 12,46. Then the cord 34 would be identically fastened to one end of the outer diameter of the fabric cap, looped through the car door 56 and fastened to the opposite end of the outer diameter of the fabric cap 46. It is contemplated that any means known to one skilled in the art could be used to connect the two caps. For example, snaps, Velcro or other means could be used.

The second embodiment of the present invention is designed large enough to be easily seen by others, particularly other fans, when they observe the fan's car. Further, the quick and easy interchangeability of the fabric cap 46 to the molded cap 12 allows a fan to change the displayed team preference easily. This embodiment also allows a fan to display preference merely by placing the fabric cap he or she normally wears onto the molded cap.

A method of assembly of the first embodiment of the present invention includes inserting and securing a magnet 28 to a metallic attaching bar 24, securing the attaching bar 24 within the inside diameter of the molded cap 12, adapting a protective pad 32 to cover the surface of the magnet 28, and finally affixing the magnet 28 to the metal surface 11.

A method of assembly of the second embodiment includes inserting and securing the magnet 28 to the attaching bar 24, fitting a fabric cap 46 over the molded cap 12, securing the fabric cap 46 to the molded cap 12, securing the attaching bar 24 within the inside diameter of the molded cap 12, adapting a protective pad 32 to cover the surface of the magnet 28, and finally affixing the magnet 28 to the metal surface 11.

An alternative or additional means of securing the ornamental device 10 to the metal surface 11 of either embodiment is to connect a cord 34 to one side of the molded cap 12 or both caps 12,46, depending on the embodiment, looping the cord 34 through the interior of a car door 56 and attaching the endmost end of the cord 34 to the opposite side of a molded cap 12 or both caps 12,46.

Figure 5:
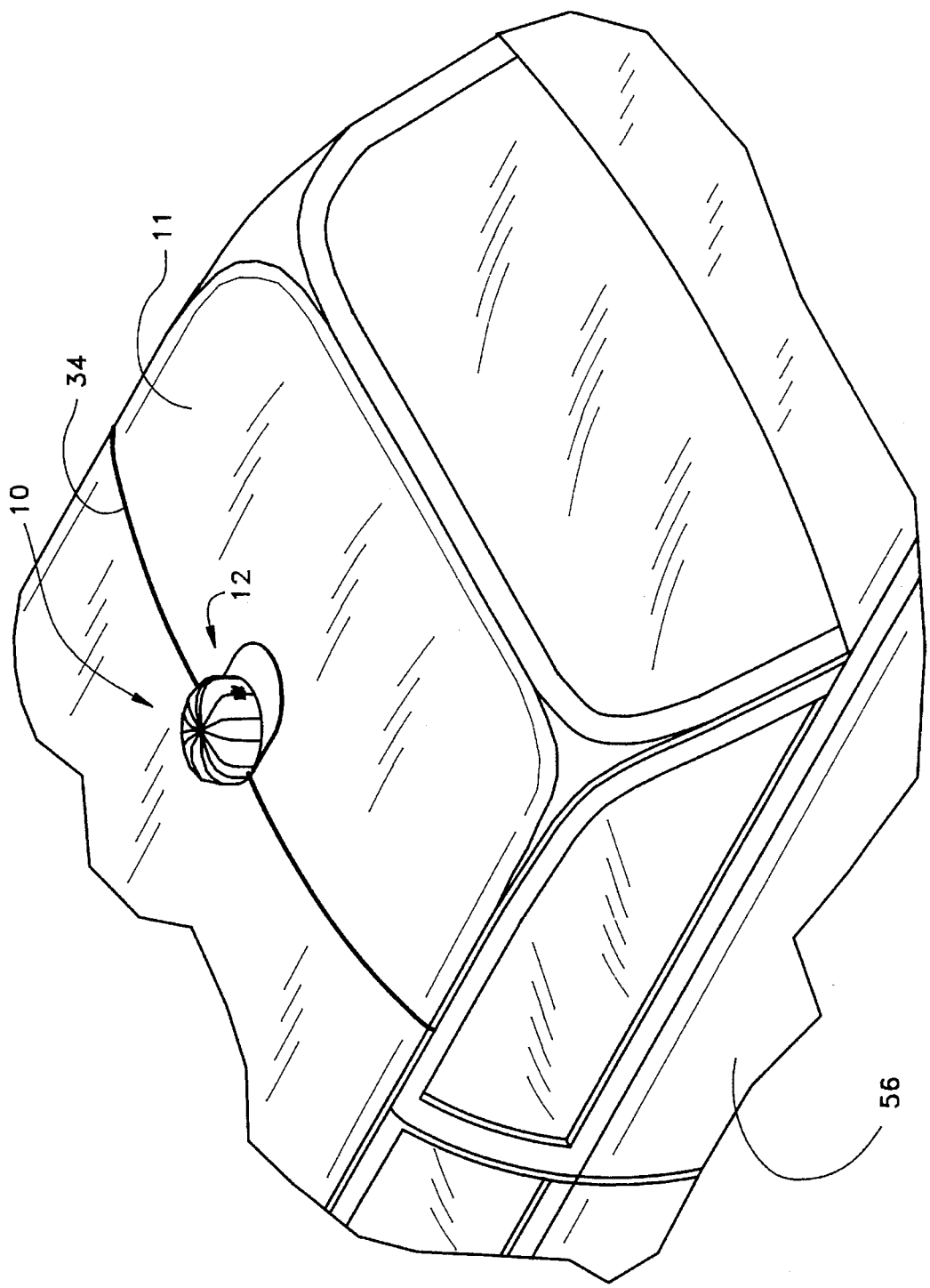
FIG. 5 is a perspective view of the first embodiment of the present invention in use on a representative vehicle metal structure.

Referring lastly to FIG. 5, there is again seen the first embodiment of the present invention in use on a representative vehicle metal surface 11. More clearly seen in FIG. 5 is how the cord 34 passes into and through the vehicle to secure the ornamental device 10.

The present invention is adaptable to a variety of other purposes. For instance, the device may be easily adapted to the outer surface of a small outboard motorboat, or even a tractor. In either case, and others limited only by the imagination of the user, other sports fans will see and know the team preference of the user of the present invention.

The foregoing description of the invention is explanatory thereof and various changes in the size, shape, and materials, as well as on the details illustrated fabrication can be made, within the scope of the appended claims, without departing from the spirit of the invention.

What is claimed is:

1. In combination, a vehicle having a generally flat, horizontal exterior surface, and an ornamental device mounted on said surface comprising a molded cap, of a size to be worn on a human head, having a hollow crown and a visor extending therefrom, said cap having a logo thereon, and;

attaching means connected to said cap for removably mounting said cap to said surface.

2. The device of claim 1, wherein said attaching means is a magnet.

3. The device of claim 2, wherein said attaching means further includes an attaching bar, said bar adapted to fit within an inside diameter of said cap, wherein said attaching bar is approximately the length of the inside diameter of said cap, and wherein said magnet is attached to said attaching bar.

4. The device of claim 1, further including means for protecting a surface of a vehicle when said device is connected to said vehicle surface.

5. The device of claim 4, wherein said protective means is a felt pad.

6. The device of claim 1, wherein said molded cap is made of plastic.

7. The device of claim 1, wherein said attaching means is a cord connected at both ends to said cap.

8. The device of claim 1, wherein said attaching means comprises a cord having two ends, each end connected to said cap.

9. The device of claim 1, wherein said attaching means comprises:

a magnet; and a cord having two ends, both ends connected to said cap.

10. The device of claim 9, wherein each of said ends has a knot formed therein and located within the hollow portion of said cap.

11. In combination, a vehicle having a generally flat, horizontal exterior surface, and an ornamental device mounted on said surface comprising:

a molded cap, generally of a size to be worn on human head, having a hollow crown and a visor extending therefrom;

a fabric cap having a corresponding hollow crown and visor extending therefrom;

attaching means for mounting said molded cap to said surface, and;

fastening means for securing said fabric cap to said molded cap.

12. The ornamental device as defined in claim 11, wherein said molded cap is made of plastic.

13. The ornamental device as defined in claim 11, wherein said means for attaching is a magnet.

14. The ornamental device as defined in claim 11, wherein said means for attaching is a cord having two ends, each end connected to said molded cap.

15. The ornamental device as defined in claim 11, wherein said means for attaching comprises a magnet and a cord.

16. The ornamental device as defined in claim 11, wherein said means for securing comprises a rubber band.

* * * * *